United States Patent [19]

Krause et al.

[11] Patent Number: 5,500,257
[45] Date of Patent: Mar. 19, 1996

[54] METHOD OF PREPARING A FLUOROPOLYMER COMPOSITE

[75] Inventors: Edward K. Krause, Ann Arbor; Kenneth J. Kuenzel, Grass Lake, both of Mich.

[73] Assignee: Pilot Industries, Inc., Dexter, Mich.

[21] Appl. No.: 499,207

[22] Filed: Jul. 7, 1995

Related U.S. Application Data

[63] Continuation of Ser. No. 200,941, Feb. 23, 1994, abandoned, which is a continuation of Ser. No. 817,304, Jan. 6, 1992, abandoned.

[51] Int. Cl.$^6$ .................................................. C08F 2/46
[52] U.S. Cl. .......................... 427/487; 427/58; 427/105; 427/322; 427/420; 427/536; 427/569
[58] Field of Search .............................. 427/487, 58, 105, 427/322, 420, 536, 569

[56] References Cited

U.S. PATENT DOCUMENTS

| | | | |
|---|---|---|---|
| 3,017,339 | 1/1962 | Dewey | 204/169 |
| 3,133,854 | 5/1964 | Simms | 156/272.6 |
| 3,352,714 | 11/1967 | Anderson et al. | 117/213 |
| 3,455,774 | 7/1969 | Lindsey et al. | 136/272.6 |
| 3,457,139 | 7/1969 | James | 156/272.6 |
| 3,473,087 | 10/1969 | Slade | 317/2 |
| 3,507,763 | 4/1970 | McBride | 204/169 |

(List continued on next page.)

FOREIGN PATENT DOCUMENTS

| | | |
|---|---|---|
| 686119 | 5/1964 | Canada . |
| 0385731 | 1/1986 | European Pat. Off. . |
| 0185590 | 6/1986 | European Pat. Off. . |
| 479592 | 4/1992 | European Pat. Off. . |
| 1290717 | 3/1969 | Germany . |
| 3524631 | 1/1986 | Germany . |
| 3930350 | 3/1991 | Germany . |

(List continued on next page.)

OTHER PUBLICATIONS

"Pilot Industries Wins Top Plunkett Award," Plastics News, Wilmington, Delaware, 5 Apr. 1993, p. 8.
"'P-CAP' from Pilot Industries Inc. First Place Winner 1993 Plunkett Awards for Innovation with 'Teflon'," DuPont Background, DuPont External Affairs, Wilmington, Delaware (No Month Available).
"Pilot Industries Wins Top Award for Innovation," Pilot Industries Inc., Dexter, Michigan (No Date Available.)
"DuPont Announces Winners for 1993 Plunkett Awards for Innovation with 'Teflon'", DuPont News, DuPont External Affairs, Wilmington, Delaware, Mar. 1993.
Dyne–A–Mite™ Solves Adhesion Problems, Promotional brochure from Enercon Industries Corporation, Menomee Falls, Wisconsin. (No Date).
Ceramic Coatings: More Than Just Wear Resistant, Edward S. Hamel, ME, Aug. 1986, pp. 30–34.
Gas Plasma Technology and Its Applications, Stephen L. Kaplan and Robert Holland, Mar. 1987, Plasma Science, Belment, Calif.

(List continued on next page.)

Primary Examiner—Bernard Pianalto
Attorney, Agent, or Firm—Gifford, Krass, Groh, Sprinkle, Patmore, Anderson & Citkowski

[57] ABSTRACT

Described herein is a method of preparing a fluoropolymer composite tube comprising the steps of activating a formed fluoropolymer substrate by subjecting the substrate to a charged gaseous atmosphere formed by electrically ionizing a gas which contacts the substrate and thereafter applying a layer of a thermoplastic polymer to the activated fluoropolymer substrate. The ionizing step can be described as a corona discharge or an electrically formed plasma. In particular, described is a fuel pipe comprised of an inner fluorocarbon layer having electrostatic discharge resistance and hydrocarbon evaporative emission resistance and on top of and integral with, the fluorocarbon layer an outer layer of a thermoplastic polymer. Fluoropolymer layers have excellent chemical resistance.

8 Claims, 5 Drawing Sheets

U.S. PATENT DOCUMENTS

| | | | |
|---|---|---|---|
| 3,676,181 | 7/1972 | Kowalewski | 117/47 |
| 4,188,426 | 2/1980 | Auerbach | 204/169 |
| 4,272,585 | 6/1981 | Strassel | 428/413 |
| 4,293,663 | 10/1981 | Stivers | 525/187 |
| 4,330,017 | 5/1982 | Satoh et al. | 138/141 |
| 4,343,861 | 8/1982 | Stivers | 428/413 |
| 4,353,763 | 10/1982 | Simons | 156/184 |
| 4,358,559 | 11/1982 | Holcomb et al. | 524/380 |
| 4,564,662 | 1/1986 | Albin | 536/247 |
| 4,603,712 | 8/1986 | Krause | 138/137 |
| 4,634,615 | 1/1987 | Versteegh et al. | 138/141 |
| 4,636,272 | 1/1987 | Riggs | 156/158 |
| 4,654,235 | 3/1987 | Effenberger et al. | 427/407.3 |
| 4,718,568 | 1/1988 | Dal Palù | 220/86 R |
| 4,731,156 | 3/1988 | Montmarquet | 156/643 |
| 4,743,327 | 5/1988 | DeHaan et al. | 156/272.6 |
| 4,748,204 | 5/1988 | Kawashima et al. | 525/72 |
| 4,749,610 | 6/1988 | Katsuragawa et al. | 428/228 |
| 4,758,455 | 7/1988 | Campbell et al. | 428/36 |
| 4,770,927 | 9/1988 | Effenberger et al. | 428/245 |
| 4,800,109 | 1/1989 | Washizu | 428/34.9 |
| 4,826,731 | 5/1989 | Wagner et al. | 428/422 |
| 4,887,647 | 12/1989 | Igarashi et al. | 138/126 |
| 4,898,638 | 2/1990 | Lugez | 156/272.6 |
| 4,933,060 | 6/1990 | Prohaska et al. | 204/192.36 |
| 4,943,473 | 7/1990 | Sahatjian et al. | 428/245 |
| 4,995,028 | 2/1991 | Boling et al. | 369/275.5 |
| 5,008,340 | 4/1991 | Guerra et al. | 525/193 |
| 5,051,978 | 9/1991 | Mayer et al. | 369/275.5 |
| 5,056,512 | 10/1991 | Bower et al. | 128/201.25 |
| 5,059,480 | 10/1991 | Guerra et al. | 428/34.9 |
| 5,077,115 | 12/1991 | Arthur et al. | 428/137 |
| 5,081,326 | 1/1992 | Usui | 174/47 |
| 5,089,200 | 2/1992 | Chapman et al. | 264/127 |
| 5,108,780 | 4/1992 | Pitt et al. | 156/272.6 |
| 5,124,878 | 7/1992 | Martucci | 138/125 |
| 5,141,800 | 8/1992 | Effenberger et al. | 428/267 |
| 5,170,011 | 12/1992 | Martucci | 174/47 |
| 5,284,184 | 2/1994 | Noone | 138/121 |
| 5,357,005 | 10/1994 | Buchwalter et al. | 156/272.6 |

FOREIGN PATENT DOCUMENTS

| | | |
|---|---|---|
| 5738272 | 6/1962 | Japan . |
| 639533 | 2/1963 | Japan . |
| 53-58588 | 5/1978 | Japan . |
| 5733373 | 1/1980 | Japan . |
| 58-114979 | 8/1983 | Japan . |
| 58-201613 | 11/1983 | Japan . |
| 62-162542 | 7/1987 | Japan . |
| 1174442 | 12/1987 | Japan . |
| 63-224943 | 9/1988 | Japan . |
| 1-154755 | 6/1989 | Japan . |
| 2107371 | 4/1990 | Japan . |
| 3114829 | 5/1991 | Japan . |
| 2204932 | 11/1988 | United Kingdom . |

OTHER PUBLICATIONS

Plasma Treatment Upgrades Adhesion in Plastic Parts, Stephen L. Kaplan and Peter W. Rose, Plastics Engineering, May 1988, pp. 77–79.

Plasma–Sprayed Coatings, Herbert Herman, Scientific American, Sep. 1988, pp. 112–117.

Achieving Optimum Bond Strength With Plasma Treatment, George P. Hansen et al., Society of Manufacturing Engineers, Sep. 1989, Paper No. AD 89–537.

Properties Of Polymers Used in Hose Manufacture, Chapter 16, Hose Technology, Colin W. Evans, Publisher: Applied Science Publisher Ltd., Ripple Rd, Barking, Essex, Eng. (No Date).

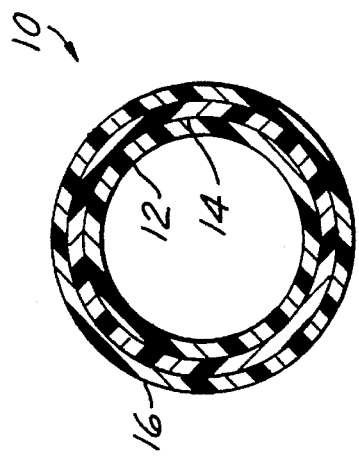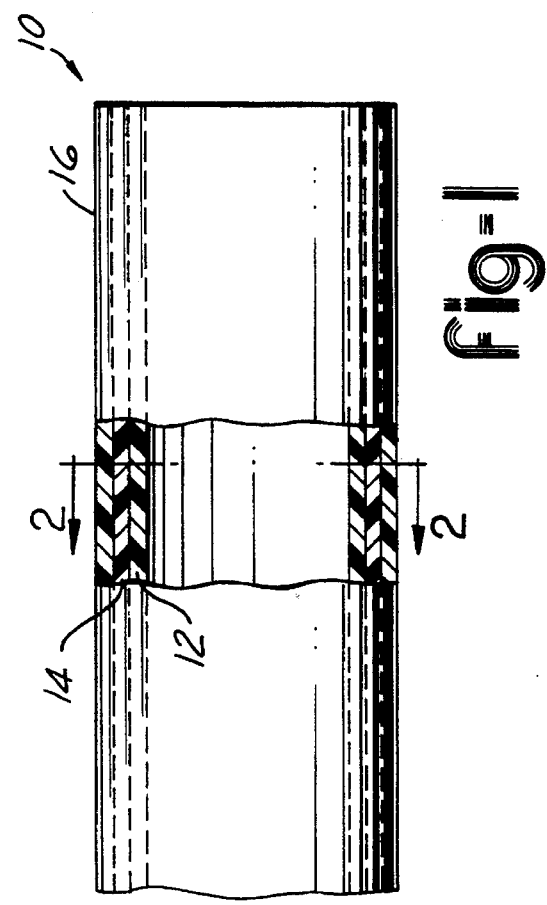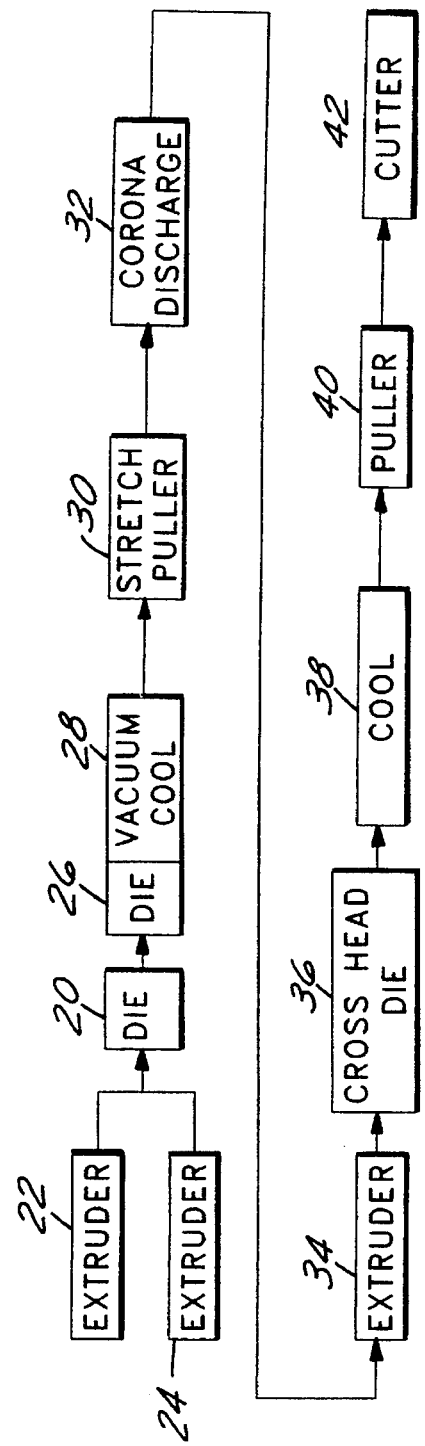

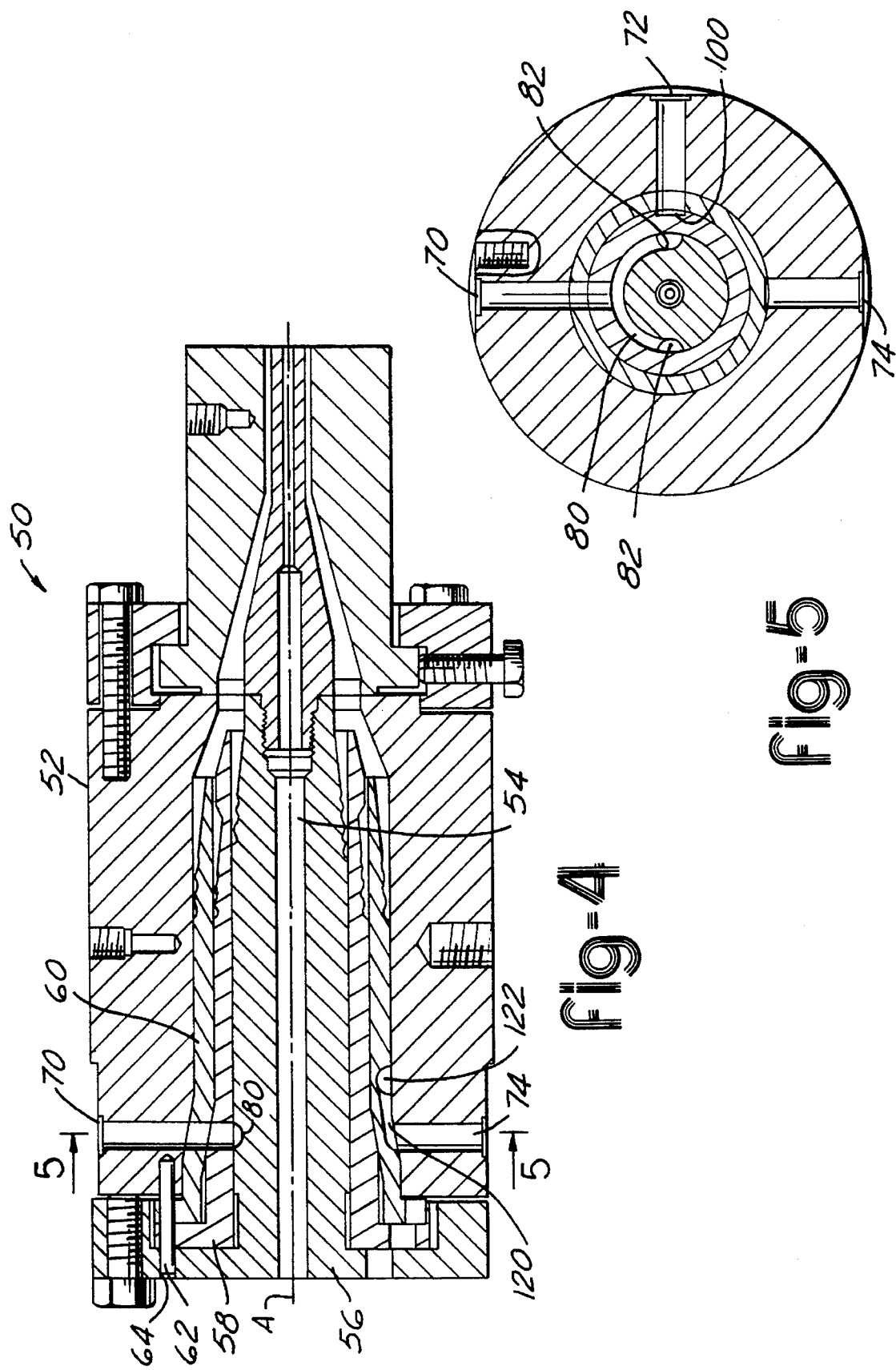

METHOD OF PREPARING A FLUOROPOLYMER COMPOSITE

This is a continuation of application Ser. No. 08/200,941 filed on Feb. 23, 1994, abandoned, which is a continuation of Ser. No. 07/817,304 filed Jan. 6, 1992, abandoned.

TECHNICAL FIELD

The invention pertains to the field of fluoropolymer tubes such as fluoropolymer composite pipes such as those used in fuel lines.

BACKGROUND ART

With the advent of increased concern with evaporative fuel standards, there has been an increasing need for fuel lines that have increased evaporative emission requirements while at the same time, having high electrostatic discharge resistance. Further, any fuel line must likewise have economic concerns that it be amenable to high production at a low cost. A desired fuel line likewise should have appropriate physical properties of sufficient tensile strength and kink resistance, that is, the resistance of the fuel line to retaining a particular shape upon bending.

Fuel line hoses of a variety of materials have been suggested over the years. Tetrafluoroethylene has been utilized and has excellent and outstanding high temperature and chemical resistance. "Hose Technology", Publisher: Applied Science Publisher, Ltd., Essex England, by: Colin W. Evans, pages 195 through and including page 211. Nylon has also been utilized as a hose composition. The difficulties with many who have attempted to utilize fluorinated polymers is the difficulty of such materials to adhere to or have adhered to them other materials to make desirable composites.

U.S. Pat. No. 4,933,060 discloses surface modification of fluoropolymers by reactive gas plasma. The reference, however, further indicates that in order to have sufficient bonding that adhesives must be utilized prior to the application of an additional layer. Suitable adhesives are epoxys, acrylates, urethanes, and the like.

U.S. Pat. No. 4,898,638 teaches a method of manufacturing flexible gaskets which withstand chemical agents. Flexible gaskets are prepared where one film of PTFE (polytetrafluoroethylene) is directly applied onto a sheet of raw rubber and subjecting the sheet of rubber together with the film of PTFE to heating and to pressure suitable for causing the rubber to vulcanize. Use of adhesives in the bonding of fluoropolymers is likewise described in U.S. Pat. No. 4,743,327 and their use is required to make the development operative. Activating fluoropolymers utilizing ammonia gas is taught in U.S. Pat. No. 4,731,156.

None of the prior art describes a multi-layered fluoropolymer with a layer of a nylon that is integral with the fluoropolymer which combined multi-layered composite or pipe has desirable electrostatic discharge resistance and hydrocarbon evaporative emission resistance. Further, the prior art suggests the need for adhesives to firmly and fixedly join plastic layers. This invention does not have as an essential requirement that additional adhesives are needed in joining the fluoropolymer layer to the thermoplastic layer.

It is an object of the present invention to have a fuel pipe or tube that has a fluoropolymer substrate that is activated sufficiently to be able to have an integral top coat or layer of a thermoplastic polymer such as nylon.

It is also an object of the present invention to prepare a fluoropolymer composite by extruding a multi-layered fluoropolymer substrate, one layer of which has desirable electrostatic discharge resistance and on top of the fluoropolymer layers would be an extruded plastic layer such as a polyamide, preferably nylon.

SUMMARY OF THE INVENTION

The present invention is concerned with a method of preparing a fluoropolymer composite tube comprising the steps of:

(1) activating a formed fluoropolymer substrate by subjecting the substrate to a charged gaseous atmosphere formed by electrically ionizing a gas which contacts the substrate;

(2) and thereafter applying a layer of a thermoplastic polymer to the activated fluoropolymer.

The invention is also concerned with a fuel pipe comprised of an inner fluorocarbon layer having electrostatic discharge resistance and hydrocarbon evaporative emission resistance, and on top of and integral with the fluorocarbon layer, an outer layer of a thermoplastic polymer.

BRIEF DESCRIPTION OF THE DRAWINGS

FIG. 1 is a side sectional view of the three-layered fuel pipe of the present invention;

FIG. 2 is a cross-sectional view of FIG. 1 along lines 2—2;

FIG. 3 is a schematic diagram of the process for the method of preparing the fuel pipe of the present invention;

FIG. 4 is a cross-sectional view of the multi-inlet extrusion die used in the method of preparing the fuel pipe of the present invention;

FIG. 5 is a cross-sectional taken along the lines 5—5 of FIG. 4;

DESCRIPTION OF PREFERRED EMBODIMENTS

Figure 6:
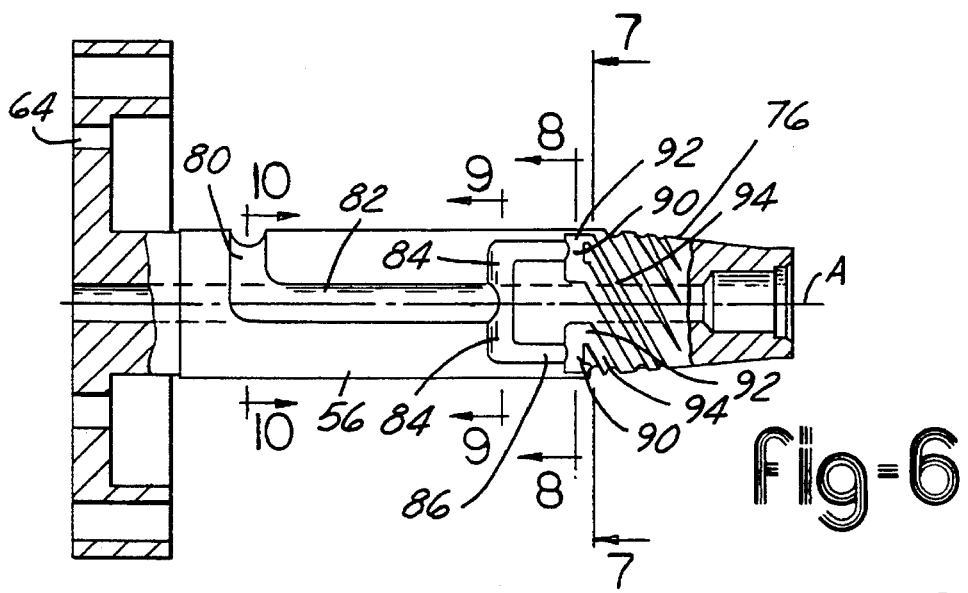
FIG. 6 is a cross-sectional view of the interior of the multi-inlet extrusion die taken along the lines 6—6 of FIG. 7.
Figure 7:
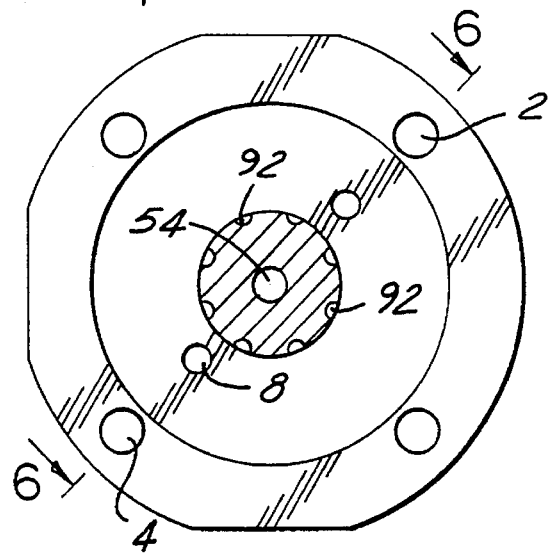
FIG. 7 is a cross-sectional view taken along the lines of 7—7 of FIG. 6.

The present invention is concerned with a method of preparing a fluoropolymer composite such as a pipe or tube. In particular, it is preferred that the fluoropolymer be a multi-layered fluoropolymer. It is preferred that the fluoropolymer layer have electrostatic discharge resistance as well as hydrocarbon evaporative emission resistance. The electrostatic discharge resistance is obtained preferably by making the fluoropolymer layer a conductive fluoropolymer. In this fashion, the electrostatic charge (electricity) that maybe generated during the flow of fuel or other fluids through the pipe or tube can be carried to ground.

It is also to be appreciated that the composite tube may have multiple layers without the presence of a conductive filler. Due to the need of having on board a vehicle a refueling vapor recovery system, it may be desirable to have a layer (or layers) of fluorocarbon polymer surrounded by a thermoplastic polymer. In this manner, the fuel vapor alone can travel through the fluoropolymer/thermoplastic polymer composite tube to any desirable location in the vehicle, e.g. an on board carbonaceous containing canister. The carbon material can absorb the fuel vapors.

The fluoropolymers that may be utilized are any of the available fluoropolymers, many of which are commercially available. Suitable fluoropolymers are ethylene-tetrafluoroethylene (ETFE), ethylene-chlorotrifluoroethylene (ECTFE), fluorinated ethylenepropylene (FEP), perfluoroalkoxy (PFA), polyvinylfluoride (PVF), polyvinylidene fluoride (PVDF), polychlorotrifluoroethylene (PCTFE), polytetrafluoroethylene (PTFE). Other fluoropolymers are those that are prepared from perfluorinated α-fluoroolefin monomers containing hydrogen atoms as well as fluorine atoms. The α-fluoroolefin has 2–6 carbon atoms. Typical α-fluoroolefins may be perfluorinated α-fluoroolefins such as hexafluoropropene, perfluorobutene, perfluoroisobutene, and the like, and hydrogen containing α-fluoroolefins such as trifluoroethylene, vinylidene fluoride, vinyl fluoride, pentafluoropropane, and the like, and halogen-containing α-fluoroolefins such as trifluorochloroethylene, 1, 1-difluoro- 2,2 dichloroethylene, 1, 2-difluoro-1, 2 dichloroethylene, trifluorobromoethylene and the like, and perfluoroalkoxyethylene polymers. The most preferred fluoropolymer is ETFE sold under the trademark Tefzel® (trademark of DuPont).

The layer of fluoropolymer that is to be conductive in order to carry away the electrostatic discharge can generally be made conductive in a well known manner. This conductivity can occur by adding conductive particles to the fluoropolymer resin prior to processing. The electrically conductive particles incorporated into fluoropolymers are described in U.S. Pat. No. 3,473,087, hereby incorporated by reference. Suitable conducting materials would be carbon black in the amount of 0.1–10 weight percent of the total fluoropolymer layer, preferably 0.1–2 weight percent. The carbon black is blended with the fluoropolymer prior to the extrusion taking place. Conductive fluoropolymer resin is likewise commercially available.

It is preferred that the fluorinated polymer be extruded by a melt extrusion technique where the first layer would be a conductive fluoropolymer and coextruded with it would be the second layer on top of the first layer wherein the second layer is a fluoropolymer without the conducting particles therein.

On top of the second fluoropolymer layer, and integral with it is an extruded thermoplastic material. The thermoplastic material can be a variety of thermoplastic resinous materials. Suitable materials would be those that can be melt extruded on top of the extruded fluoropolymer pipe or tube. Such resinous materials could be acrylate materials, polyester materials, bromoisobutene-isoprene materials, polybutadiene, chlorinated butyl rubber, chlorinated polyethylene, polychloromethyloxirane, chloroprene, chlorosulphonylpolyethylene, ethyleneoxide and chloromethyloxirane polymer. Ethylenepropylenedieneterpolymer, ethylenepropylenecopolymer, polyetherurethanes, isoprene, isobutene isoprene, nitrile butadiene, polyamide, polyvinylchloride, styrenebutadiene, polysulfide, polyolefins, polyphenylsulfides and polysulfones (e.g. Astrel, a trademark of 3M, polyether sulfone of ICI and Udel, a trademark of Union Carbide). Most preferably, a polyamide is employed, and even more preferably, a nylon such as nylon 66 which is a condensation product of adipic acid and hexamethylenediamine, nylon 6 which is a polymer of caprolactam, nylon 4 which is a polymer of butyrolactam (2-pyrrolidone), nylon 2 made from butadiene, and the like. The most preferred nylon is the nylon 12 available under the trademark of L25 FVS 40 from EMS of Switzerland.

In the melt extruding process for the formation of polyfluoropolymer layers, the extrusion temperature that is utilized ranges from about 500° to about 800° F., preferably about 550°–700° F., with the screw revolutions per minute (RPM) ranging from about 1 to about 100 RPM, preferably 5–50 RPM.

The end product that is produced is the multi-layered fluoropolymer having a thermoplastic material on top 10 as shown in FIGS. 1 and 2. The conductive layer 12 is co-extruded with the non-conductive layer 14. The conductive particles (not shown) are present in the layer 12.

When the multiple layers of fluoropolymer composite without conductive filler is desired, then the same fluoropolymer is co-extruded to form the multiple layers. Obviously, one may desire only one fluoropolymer layer, in which case, a single extrusion die could be used. Thereafter, the additional processing steps are followed.

Prior to the extruding of the top thermoplastic, e.g. polyamide layer 10, the fluoropolymer should be activated. In other words, the outer portion of layer 14 which is to come into contact with the layer 10 should have its surface activated by plasma discharge or corona discharge. By this is meant that the fluoropolymer layer 14 is to be subjected to a charged gaseous atmosphere that is formed by electrically ionizing a gas which contacts the substrate 14. It is most preferred that the corona electrode orientation be on opposite sides of the moving fluoropolymer tube. In other words, there is a first stage for corona electrode discharge where approximately 270° of the plastic tube is subjected to the corona discharge. The tube is anywhere from about 0.05 to 3 inches, preferably 0.1 to 0.5 inches from the electrode as the tube passes through the corona electrode discharge. Thereafter, within approximately 3 inches to 3 feet, preferably 6" to 18" from the first corona discharge device, the tube comes in contact with a second stage corona discharge placed on the opposite side from the first side where again the tube is subjected to approximately a 270° contact around the tube with the corona discharge. In this fashion, the entire circumference of 360° of the tube is subjected to activation by corona discharge.

The corona discharge equipment that is most preferably employed is available from Enercon Dyne-A-Mite, Model B12, which uses an air blown electrical arc to form the treatment plasma. In other words, there are two separate corona discharge heads making up two separate stages which are in the open air, ambient temperature and pressure atmosphere. Each corona discharge head of the Enercon device, each trapezoidal in shape, has a pair of wire electrodes (0.065" diameter) in the same horizontal plane separated by a gap of 0.35" with an overall length from end of one wire electrode to end of the second wire electrode of 1.9".

It is to be appreciated that the open air and open atmosphere is the most preferred economical approach for corona discharge. It is to be appreciated further that depending upon the amount of activation that is required and the particular materials that are to be applied to the fluoropolymer that closed chamber electrode discharge devices could be utilized. In a closed chamber environment, a pair of oppositely charged (positive and negative electrodes) may be utilized by passing a current therebetween, thereby ionizing a gas. The substrate can pass through the electric field which has ionized the gas. This gas may be altered by supplying additional gases to the chamber such as oxygen, nitrogen, argon or other reactive gases such as carbon monoxide, fluorinated gases, carbon dioxide, hydrogen fluoride, carbon tetrafluoride, ammonia, and the like. The chamber may be operated at vacuum pressure such as from 0.01 to 100 torr (1 atmosphere equals 760 torr).

A coextrusion die (FIG. 21) is used for high production rates. Therefore, the extruded tube as it passes through the corona discharge stage moves at a high constant rate. Preferably, the rate is from 1 foot to fifty (50) linear feet per minute (FPM), preferably 15 to 30 FPM. The Enercon device has treatment area for the corona discharge of about 2½" by 2" per head.

When the Enercon Dyne-A-Mite corona discharge device is utilized, the activated tube is not significantly hot to the touch, but is perhaps 10° or 20° F. over ambient temperature. This increases the safety in manufacturing the fuel tube or pipe.

Figure 21:
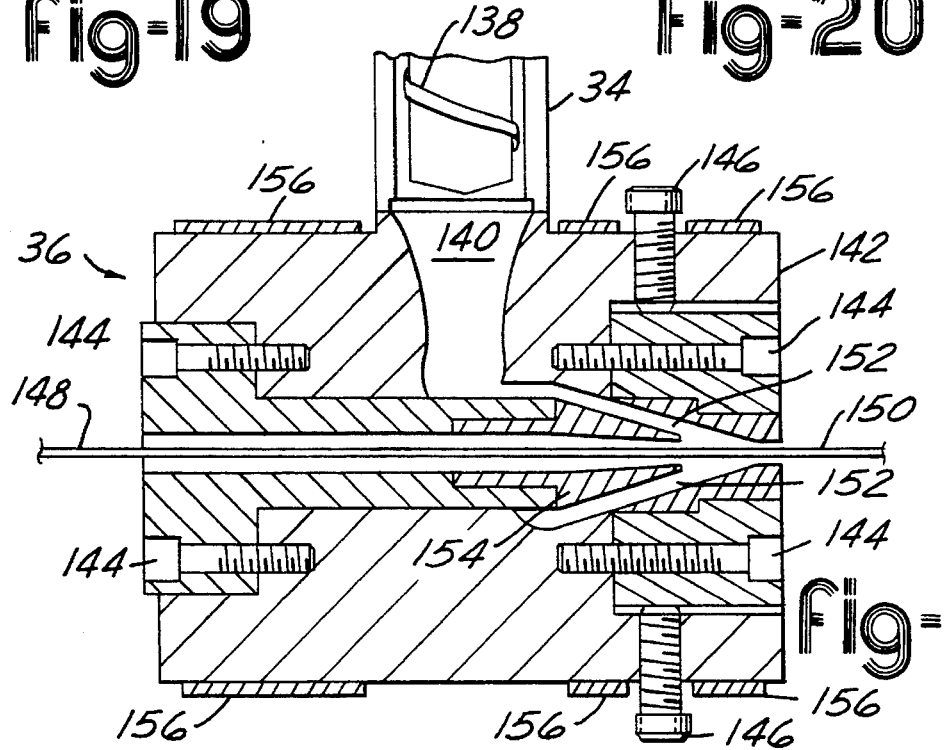
FIG. 21 is a cross-sectional view of the cross-head die as schematically shown in FIG. 3.

After the activation of the fluorinated tube, the thermoplastic is extruded through the cross-head die as shown in FIG. 21 and schematically in FIG. 3. The cross-head die is at an extrusion temperature sufficient to melt the thermoplastic resin. Generally, the temperature is significantly less than the extrusion temperature of the fluorinated plastic. The operative temperature for the cross-head die would range from about 300° to about 500° F., preferably 350° to about 450° F. with a screw RPM of 10 to 100 RPM, preferably 20 to 60 RPM with a line speed of approximately 5 to 100 feet per minute, preferably 15 to 70 feet per minute.

The Enercon device is preferably operated at an output of 15,000 volts with 30 millamps plasma per electrode with 2 electrode stages being employed.

The wattage that is applied to the electrodes in order to ionize the gas can vary substantially. For example, the wattage may vary from 250 joules/sec to 600 joules/sec when the tube being treated is about 25 sq. inches/min. (assuming 1" outer diameter OD tube 12" long), i.e. about 10 to 24 joules per linear foot of tube.

Turning now to a description of the drawings, the schematic diagram of FIG. 3 indicates that a coextrusion takes place in the coextrusion die 20 from extruders 22 and 24. After the formed tube leaves die 20, it then enters into die 26 which is in the entranceway to the vacuum water-cooled chamber 28. The temperature of the water is room temperature. The tube is then passed along horizontally to the stretch puller 30. The tube leaves the stretch puller and is exposed to the corona discharge 32 schematically shown in FIG. 3. Thereafter, the activated fluoropolymer substrate is subjected to an extrusion of a thermoplastic polymer from extruder 34. The fluoropolymer inner layer passes through crosshead die for sizing at reference numeral 36. Thereafter the composite tube is cooled by vacuum cooler 38. The tube is pulled axially through the vacuum cooler by puller 40 and thereafter is cut by cutter 42 to desired size.

The operation of the die will now be described. While FIG. 4 shows three inlet lines, it is most preferred that a two inlet coextrusion die be utilized for two coextruded layers of fluorinated polymers to be prepared, one being the conductive layer and the other being a non-conductive layer. Obviously, if only a single layer of fluoropolymer is used, a commercially available tube forming extrusion die can be used.

The die assembly 50 shown in FIG. 4 includes a die housing 52 having an inner die member 56, a center die member 58 and an outer die member 60 as the main structural members. The die members 56, 58 and 60 are concentric and generally cylindrically-shaped extrusion die members. Throughbore 54 extends along axis "A" of the die assembly 50. The die members 56, 58 and 60 are held together by a bolt or pin 62 or the like which extends through the orifice 64.

With additional reference to FIG. 5, in the preferred embodiment, the extrusion die members 56, 58 and 60 have inlets 70, 72 and 74, respectively, extending inwardly from the outer periphery of the die housing 50 to the associated die member. As best shown in FIG. 5, the inlet 70 preferably extends to a semi-circumferential distribution channel 80, through which extrusion material is passed for distribution to the extrusion end 76 of the die assembly 50, as described in greater detail herein below.

Figure 10:
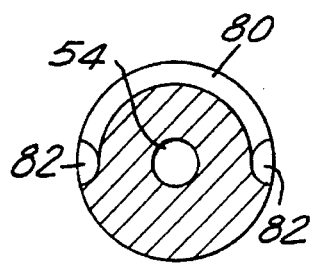
FIG. 10 is a cross-sectional view taken along the lines 10—10 of FIG. 6.

As best shown in FIG. 10, the distribution channel 80 is in fluid communication with a pair of axial distribution channels 82. As illustrated, the axial distribution channels 82 are preferably disposed symmetrically around the inner die member 56 and extend therealong toward the extrusion end 76.

Figure 9:
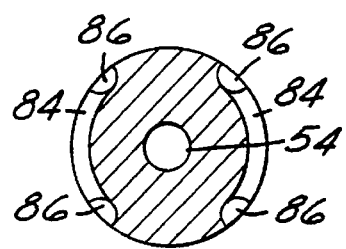
FIG. 9 is a cross-sectional view taken along the lines 9—9 of FIG. 6.

Referring now to FIG. 6 and FIG. 9, there is shown cross-sections of the inner die member 56. Each axial distribution channel 82 is in fluid communication with a pair of branch distribution channels 84. As illustrated, the branch distribution channels 84 extend around the inner die member 56 in a generally semi-circumferential manner. The branch distribution channels 84 are in fluid communication with four (4) axial distribution channels 86.

Figure 8:
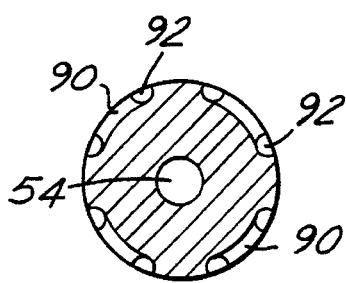
FIG. 8 is a cross-sectional view taken along the lines 8—8 of FIG. 6.

With reference to FIG. 6, the axial distribution channels 86 extend along axis "A" of the inner die member 56 toward the extrusion end 76. The channels 86 are in fluid communication with a plurality of branch distribution channels 90, which extend around the inner die member 56 in a partial circumferential manner, as best shown in FIG. 8. In the preferred embodiment, the distribution channels 90 are in fluid communication with eight (8) axial distribution channels 92 (only four of which are specifically illustrated in FIG. 6), which also extend along axis "A" toward the extrusion end 76. As shown in FIG. 6, the axial distribution channels 92 are in fluid communication with a plurality of generally screw-shaped channels 94 disposed around the extrusion end 76 in a spiral manner.

Thus, extrusion material enters the inlet 70 and travels to the inner die member 56. At semi-circumferential distribution channel 80, the extrusion material splits and enters the axial distribution channels 82. The material travels along the channels 82 and splits again at the branch distribution channels 84. The extrusion material then enters the axial distribution channels 86 and travels therealong to the branch distribution channels 90, where the material splits again and enters the eight axial distribution channels 92. From the channels 92, the extrusion material enters the screw-shaped channels 94. These screw-shaped channels 94 function to provide even distribution and good uniformity of the extrusion material during the extrusion process.

Figure 11:
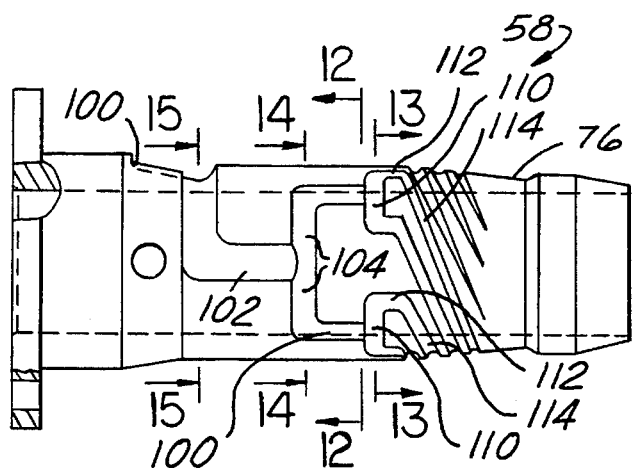
FIG. 11 is a cross-sectional view of the center extrusion die that is a part of the multi-inlet extrusion die of FIG. 4.
Figure 12:
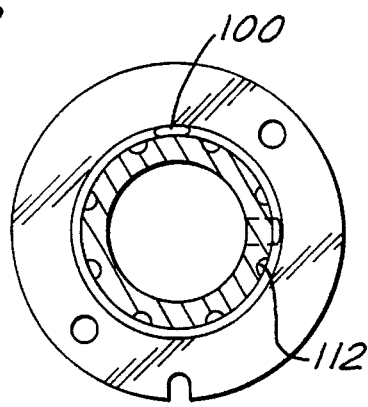
FIG. 12 is a cross-sectional view taken along the lines 12—12 of FIG. 11.
Figure 15:
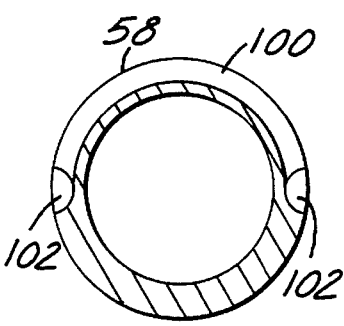
FIG. 15 is a cross-sectional view taken along the lines 15—15 of FIG. 11.

Referring now to FIGS. 11 and 15, there are shown various cross-sections of the center die member 58. Extrusion material enters the center die member 58 through the inlet 72 (as best shown in FIG. 1). The inlet 72 preferably extends to a semi-circumferential distribution channel 100, through which extrusion material is passed for distribution to the extrusion end 76', as described in greater detail herein below.

Figure 14:
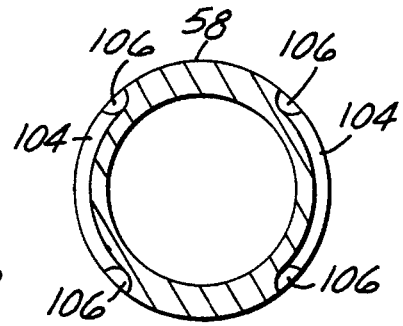
FIG. 14 is a cross-sectional view taken along the lines 14—14 of FIG. 11.

As best shown in FIG. 15, the distribution channel 100 is in fluid communication with a pair of axial distribution channels 102. As illustrated, the axial distribution channels 102 are preferably disposed symmetrically around the center die member 58 and extend therealong toward the extrusion end 76'. In the preferred embodiment, each axial distribution channel 102 is in fluid communication with a branch distribution channel 104. As best shown in FIG. 14, the branch distribution channels 104 extend around the center die member 58 in a generally semi-circumferential manner. The channels 104 are in fluid communication with four (4) axial distribution channels 106.

Figure 13:
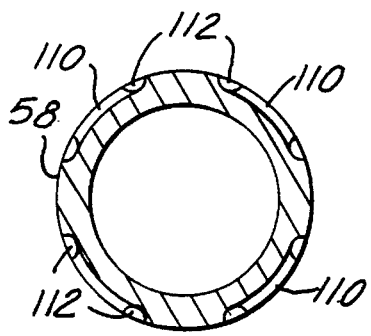
FIG. 13 is a cross-sectional view taken along the lines 13—13 of FIG. 11.

With continuing reference to FIG. 11, the axial distribution channels 106 extend along the center die member 58 toward the extrusion end 76'. The channels 106 are in fluid communication with a plurality of branch distribution channels 110, which extend around the center die member 58 in a partial circumferential manner, as best shown in FIG. 13. In the preferred embodiment, the distribution channels 110 are in fluid communication with eight (8) axial distribution channels 112 (only four of which are specifically illustrated in FIG. 11), which also extend along the member 58 toward the extrusion end 76'. As shown in FIG. 11, the axial distribution channels 112 are in fluid communication with a plurality of generally screw-shaped channels 114 disposed around the extrusion end 76' in a spiral manner.

In operation, extrusion material enters the inlet 72 and travels to the center die member 58. At semi-circumferential distribution channel 100, the extrusion material splits and enters the axial distribution channels 102. The material travels along the channels 102 and splits again at the branch distribution channels 104. The extrusion material then enters the axial distribution channels 106 and travels therealong to the branch distribution channels 110, where the material splits again and enters the eight axial distribution channels 112. From the distribution channels 112, the extrusion material enters the screw-shaped channels 114. As with the inner die member, these screw-shaped channels 114 therefore function to provide even distribution and good uniformity of the extrusion material during the extrusion process.

As shown in FIGS. 4 and 5, extrusion material enters the outer die member 60 through the inlet 74. Referring now to FIGS. 16 through 20, there are shown various cross-sections of the outer die member 60. The inlet 74 preferably extends to a trough 120, which is connected to a generally semi-circumferential distribution channel 122, through which extrusion material is passed for distribution to the extrusion end 76", as described in greater detail herein below.

Figure 16:
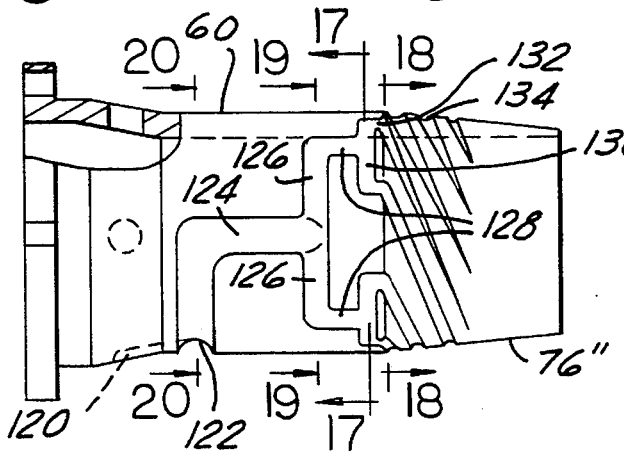
FIG. 16 is a cross-sectional view of the outer extrusion die which is a portion of the coextrusion multi-inlet die of FIG. 4.
Figure 17:
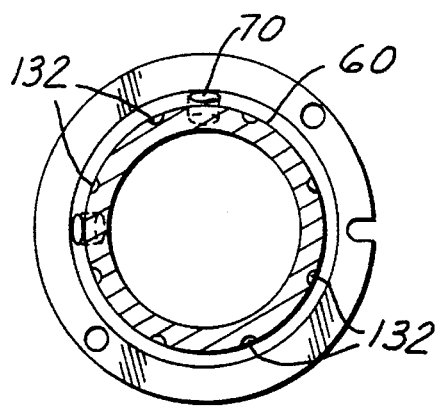
FIG. 17 is a cross-sectional view taken along the lines 17—17 of FIG. 16.
Figure 19:
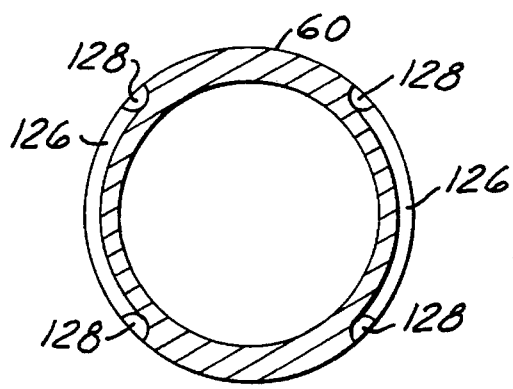
FIG. 19 is a cross-sectional view taken along the lines 19—19 of FIG. 16.
Figure 20:
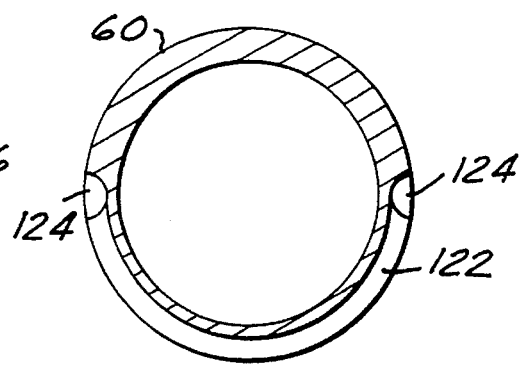
FIG. 20 is cross-sectional view taken along the lines 20—20 of FIG. 16.

With combined reference to FIG. 16 and FIG. 20, the distribution channel 122 is preferably in fluid communication with a pair of axial distribution channels 124 (only one of which is shown in FIG. 16). As illustrated, the axial distribution channels 124 are preferably disposed symmetrically around the outer die member 60 and extend therealong toward the extrusion end 76". In the preferred embodiment, each axial distribution channel 124 is in fluid communication with a branch distribution channel 126. As best shown in FIG. 19, the branch distribution channels 126 extend around the outer die member 60 in a generally semi-circumferential manner. The branch distribution channels 126 are in fluid communication with four (4) axial distribution channels 128.

Figure 18:
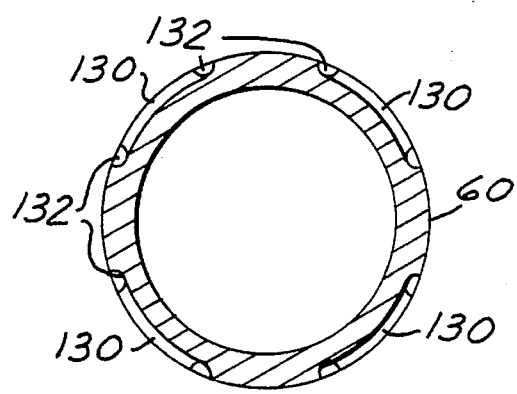
FIG. 18 is a cross-sectional view taken along the lines 18—18 of FIG. 16.

With continuing reference to FIG. 16, the axial distribution channels 128 extend along the outer die member 60 toward the extrusion end 76". The channels 128 are in fluid communication with a plurality of branch distribution channels 130, which extend around the outer die member 60 in a partial circumferential manner, as best shown in FIG. 18. In the preferred embodiment, the distribution channels 130 are in fluid communication with eight (8) axial distribution channels 132 (only four of which are specifically illustrated in FIG. 16), which also extend along the die member 60 toward the extrusion end 76". As shown in FIG. 16, the axial distribution channels 132 are in fluid communication with a plurality of generally screw-shaped channels 134 disposed around the extrusion end 76" in a spiral manner.

In operation, extrusion material enters the inlet 74 and travels to the trough 120 of the outer die member 60. At semi-circumferential distribution channel 122, the extrusion material splits and enters the axial distribution channels 124. The material travels along the channels 124 and splits again at the branch distribution channels 126. The extrusion material then enters the axial distribution channels 128 and travels therealong to the branch distribution channels 130, where the material splits again and enters the eight axial distribution channels 132. From the distribution channels 132, the extrusion material enters the screw-shaped channels 134. As with the inner and center die members, these screw-shaped channels 134 therefore function to provide good distribution and uniformity of the extrusion material during the extrusion process.

FIG. 21 is a cross-section of the crosshead die 36 schematically shown in FIG. 3. Extruder 34 having auger 138 passes material into inlet 140 of the die housing 142 which is held together by four axial screws 144 and vertical screws 146. The fluoropolymer tube 148 moves in axial fashion through the die housing 142 so that the thermoplastic material can be extruded around it resulting in the composite tube 150 exiting from the housing. The thermoplastic material passes through inlet 140 and moves around channel 152. The desired OD of the thermoplastic material is controlled by die tip 154. The housing is heated by elements 156.

The fuel line of the present invention is designed to carry hydrocarbon fuels that are generally used in vehicles such as cars, trucks, airplanes, locomotives, and the like. The fuel is generally heavy in hydrocarbon materials such as propane, butane, aromatics, such as benzine, toluene and other combustible organic materials. The combined laminate or composite therefore prevents the escape of fuel vapors from the fuel line. Other fuels such as alcohol-based fuels may also be fluids carried in the fuel pipe of the present invention. Further, other hydrocarbon-based fluids such as hydraulic fluids may likewise be utilized in conjunction with the pipe of the present invention.

It is to be appreciated by using the multiple melt extrusion stages at different positions in the manufacturing process that one can efficiently combine a fluoropolymer that has a high melt extrusion temperature with a thermoplastic material which has a substantially less melt extrusion temperature. By melt extruding the fluoropolymer layers first and then cooling down the formed pipe by running the formed tube through room temperature water, one can thereafter use a separate and distinctly different thermoplastic polymer to extrude onto the thermoplastic pipe and avoid thermal degradation of the lower melting point material.

Listed below are description of preferred embodiments where all degrees are degrees Centigrade and all parts are parts by weight, unless otherwise indicated.

EXAMPLE 1

The surface energy of various treated fluoropolymers was tested. When a dyne solution is placed on a material surface and wets out, that indicates that the material has a higher surface energy than the dyne solution. If the drop "beads up" the material has a lower surface energy than the dyne solution. The use of the dyne solutions is a technique for determining the surface energy of materials. Various samples were prepared of fluoropolymer substrates. Each of the substrates were subjected to a dyne solution identified as ethyl Cello-Solve-Formamide (Trademark of Corotec of Connecticut, U.S.A.). The sample plaques were wiped clean with a dry cloth to remove surface contamination. Solvent was not used to avoid any surface effects from the residue. The dyne solution was applied in a single side-stroke of the brush to leave a ¾ inch by 1 inch patch of solution. Measurements were taken on both treated and untreated samples. The values recorded represent solution which held in a continuous film for greater than 2 seconds. Treated samples were prepared by sweeping the discharge head of the Enercon-Dyne-A-Mite device. Treated samples were prepared by sweeping the discharge head across the plaque at a rate of ½ inch to ½ inch away from the sample surface. Two passes were made to ensure complete coverage. Listed below are the test results for the samples tested.

| Sample | initial ($E_S$ - Surf. Energy) | After Treatment ($E_S$ - Surf. Energy) |
|---|---|---|
| KYNAR 740[1] | 42,41,42 | 44,45,44 |
| HYLAR 460[2] | 45,46,45 | 64,58,60 |
| HALAR 500[3] | 34,35,34 | 40,37,39 |

[1]KYNAR 740 is a trademark of Atochem of North America for PVDF.
[2]HYLAR 460 is a trademark of Ausimont of Morristown, New Jersey for PVDF.
[3]HALAR 500 is a trademark of Ausimont of Morristown, New Jersey for ECTFE.

The results indicate that there is a change in surface energy which indicates that the Enercon corona discharge device activates the fluorinated samples and that they may be satisfactory substrates for extrusion of a thermoplastic such as a polyamide thereon.

While the forms of the invention herein described constitute presently preferred embodiments, many other are possible. It is not intended herein to mention all the possible equivalent forms or ramifications of the invention. It is understood that the terms used herein are merely descriptive rather than limiting and that various changes may be made without departing from the spirit or scope of the invention. For example, the invention is equally applicable to a fuel filler neck tube or to fluoropolymer/thermoplastic composites in general.

What is claimed is:

1. A method of preparing a fluoropolymer composite comprising the steps of:
   (1) chemically activating a formed fluoropolymer substrate by subjecting the substrate to a charged gaseous atmosphere formed by electrically ionizing a gas which contacts the substrate; and
   (2) thereafter chemically bonding a layer of a polyamide polymer by applying said layer of polyamide polymer to the chemically activated fluoropolymer substrate.

2. The method of claim 1 wherein the fluoropolymer substrate is an integral multi-layer tube wherein the inner layer is comprised of a conductive fluoropolymer and the outer layer is of a fluoropolymer resin.

3. The method of claim 2 wherein the outer layer of the fluoropolymer substrate is activated by subjecting the outer layer to a corona discharge operating at 250 to 600 joules per second.

4. The method of claim 1 wherein the fluoropolymer substrate is a tube.

5. The method of claim 1 wherein the fluoropolymer substrate is moving through the charged atmosphere at a rate of 1 to 50 linear feet/minute.

6. The method of claim 1 wherein the ionizing takes place at ambient temperature and pressure.

7. The method of claim 1 wherein the ionizing takes place in the presence of ambient pressure and temperature and ambient atmosphere air.

8. A method of preparing a fluoropolymer composite comprising the steps of:
   (1) chemically activating a formed fluoropolymer substrate by subjecting the substrate to a charged gaseous atmosphere formed by electrically ionizing a gas which contacts the substrate, wherein the fluoropolymer substrate is an integral multi-layer tube, wherein the inner layer is comprised of a conductive fluoropolymer and the outer layer is of a fluoropolymer resin; and
   (2) thereafter chemically bonding a layer of polyamide polymer by applying said layer of polyamide polymer to the chemically activated fluoropolymer substrate.

* * * * *

UNITED STATES PATENT AND TRADEMARK OFFICE
CERTIFICATE OF CORRECTION

PATENT NO. : 5,500,257

DATED : March 19, 1996

INVENTOR(S) : Edward K. Krause and Kenneth J. Kuenzel

It is certified that error appears in the above-indentified patent and that said Letters Patent is hereby corrected as shown below:

Column 9, line 27, insert --,-- after "'beads up'".

Column 9, line 45, "½", first occurrence, should be --¼--.

Column 9, line 49, "initial" should be --Initial--.

Column 10, line 51, insert --and--, after "tube,".

Column 10, line 53, insert --comprised-- after "is".

Signed and Sealed this

Seventeenth Day of September, 1996

Attest:

BRUCE LEHMAN

Attesting Officer

Commissioner of Patents and Trademarks